(12) United States Patent
Cox et al.

(10) Patent No.: US 8,661,069 B1
(45) Date of Patent: Feb. 25, 2014

(54) PREDICTIVE-BASED CLUSTERING WITH REPRESENTATIVE REDIRECT TARGETS

(75) Inventors: Jeff Cox, New York, NY (US); Mike Turitzin, San Francisco, CA (US); David Michael Proudfoot, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1080 days.

(21) Appl. No.: 12/059,637

(22) Filed: Mar. 31, 2008

(51) Int. Cl.
*G06F 7/00* (2006.01)
*G06F 17/30* (2006.01)

(52) U.S. Cl.
USPC ............................................ 707/826; 707/802

(58) Field of Classification Search
USPC ................................................ 707/826, 802
See application file for complete search history.

(56) References Cited

U.S. PATENT DOCUMENTS

| | | | | |
|---|---|---|---|---|
| 5,483,650 A | * | 1/1996 | Pedersen et al. | 1/1 |
| 5,832,470 A | * | 11/1998 | Morita et al. | 1/1 |
| 6,026,388 A | * | 2/2000 | Liddy et al. | 1/1 |
| 2010/0150453 A1 | * | 6/2010 | Ravid et al. | 382/218 |

* cited by examiner

*Primary Examiner* — Kuen Lu
(74) *Attorney, Agent, or Firm* — Harrity & Harrity, LLP

(57) ABSTRACT

An automated method may include clustering documents into a plurality of clusters, selecting a representative document, respectively, for two of the plurality of clusters, determining a final redirect target document for each of the representative documents in the two of the plurality of clusters, determining whether the final redirect target documents are duplicate documents of each other; and re-clustering the two of the plurality of clusters together if it is determined that the final redirect target documents are duplicate documents.

25 Claims, 17 Drawing Sheets

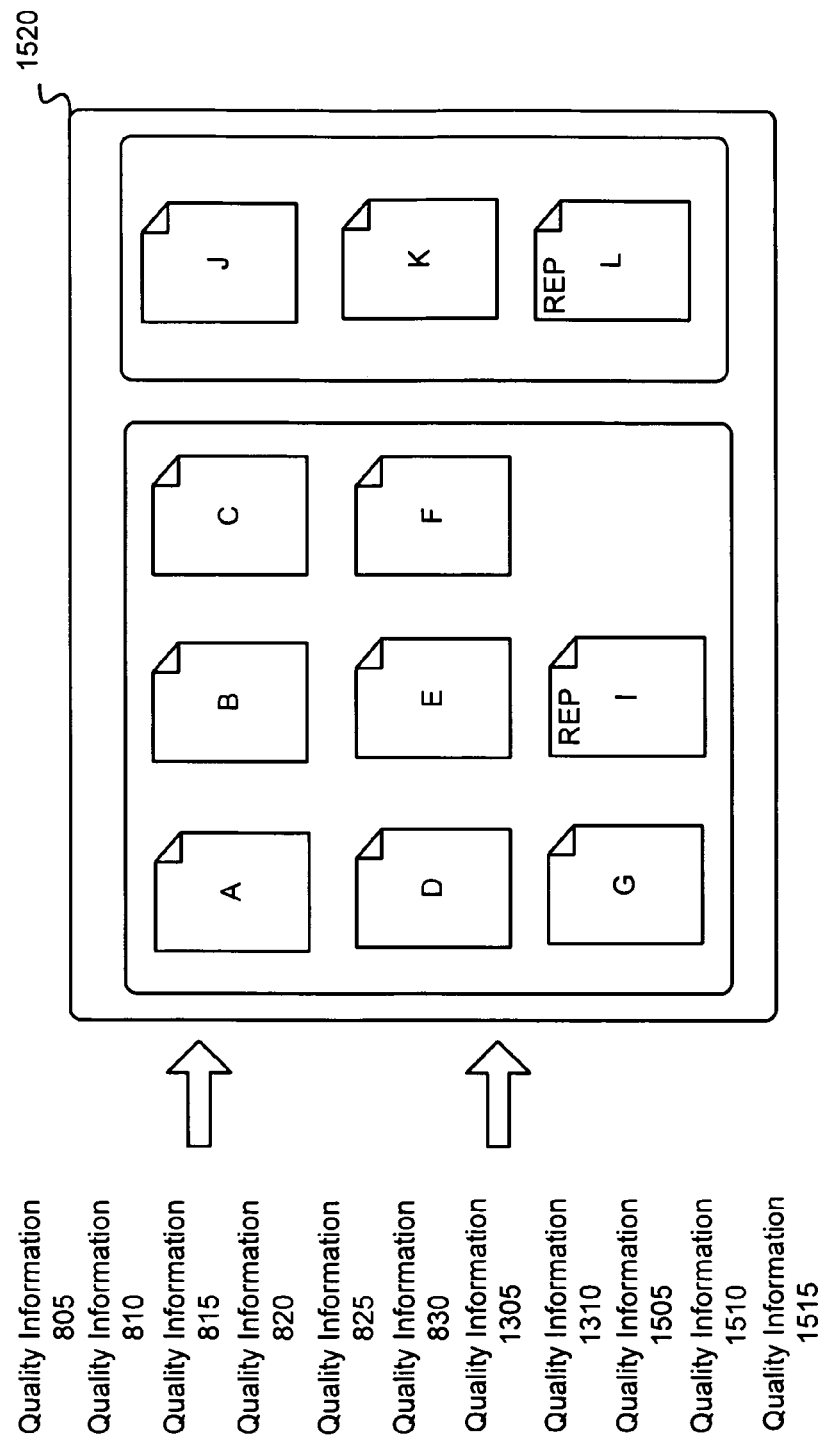

PREDICTIVE-BASED CLUSTERING WITH REPRESENTATIVE REDIRECT TARGETS

BACKGROUND

Crawler-based search engines may employ various algorithms to identify documents on the World Wide Web ("web") relevant to search terms contained in a user's query. Typically, a crawler-based search engine will include a crawler, an indexer and a search engine. The crawler is a software tool that searches the web for content (e.g., documents) to deliver to the indexer. The crawler may be provided with a seed list of addresses (e.g., Uniform Resource Locators (URLs) or some other form of Uniform Resource Identifier (URI)). The crawler may visit a document corresponding to an address in the seed list and/or reference a robots.txt file (e.g., on a web site) that provides the crawler with a list of documents that are inaccessible. As the crawler accesses a document, the crawler may, among other things, extract outgoing links (e.g., hyperlinks) to other documents that are associated with the visited document. These outgoing links or addresses may be added to the seed list. The process of visiting documents may be repeated until the crawler decides to stop. The crawler may periodically return to these addresses so that if changes have been made to these documents, the indexer may be updated.

The indexer may create an index of the documents accessed by the crawler. For example, the indexer may catalog and maintain a copy of every document that the crawler discovers and/or a location of or a pointer to the document (e.g., a URL). The indexing process may be performed on a single device or on multiple devices. The search engine may sort through the information in the indexer and present the user with the most relevant results in a particular order (e.g., a descending order of relevance).

A problem that the indexer confronts is how to handle duplicate content on the web. For example, the same document may appear duplicated or substantially duplicated in different forms or at different places (e.g., different URLs) on the web. Accordingly, it is undesirable for the indexer to index duplicate documents because it may lead to search results that would be undesirable to the user since the user does not want to be presented with multiple documents in a search result that contain the same, or substantially the same, content. Further, indexing duplicate documents wastes resources (e.g., memory, processing, etc.).

Given a set of duplicate documents, various clustering processes may be employed to determine the most relevant documents to be indexed. By clustering documents together, the indexer can select a single document from the cluster to serve as the canonical document for indexing. In this regard, the clustering processes employed may affect the quality of the documents selectable by the indexer and presented as a search result to a user.

SUMMARY

According to one aspect, an automated method may include clustering documents into a plurality of clusters, selecting a representative document, respectively, for two of the plurality of clusters, determining a final redirect target document for each of the representative documents in the two of the plurality of clusters, determining whether the final redirect target documents are duplicate documents of each other, and re-clustering the two of the plurality of clusters together if it is determined that the final redirect target documents are duplicate documents.

According to another aspect, a system may include a memory and a processor connected to the memory. The processor may be configured to form documents into a plurality of clusters, determine a measure of quality for each of the documents, select a representative document, respectively, for two of the plurality of clusters, based on the measure of quality, determine a final target document for each of the representative documents, determine addresses associated with the final target documents, determine whether the final target documents are duplicate documents based on the addresses of the final target documents, and combine the final target documents and the two of the plurality of clusters into a combined single cluster, if it is determined that the final target documents are duplicate documents.

According to yet another aspect, a computer-readable medium may contain instructions executable by at least one processor of a device. The computer-readable medium may include one or more instructions for collecting documents, one or more instructions for selecting a representative document, respectively, for two of the plurality of clusters, one or more instructions for determining a final target document for each of the representative documents, one or more instructions for determining whether the final target documents are duplicate documents based on a predictive-based clustering technique, and one or more instructions for re-clustering the two of the plurality of clusters with the final target documents into a single cluster, if it is determined that the final target documents are duplicate documents.

According to still another aspect, a system may include means for forming documents into a clusters, means for selecting a representative document, respectively, from two of the clusters, means for identifying redirect information associated with the representative documents, means for determining a final target document for each of the representative documents, means for determining whether the final target documents are duplicate documents, and means for forming the two clusters and the final target documents into a unified cluster if it is determined that the final target documents are duplicate documents.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 8-15 are diagrams illustrating exemplary operations associated with the exemplary process depicted in FIGS. 7A and 7B.

DETAILED DESCRIPTION

Figure 1A:
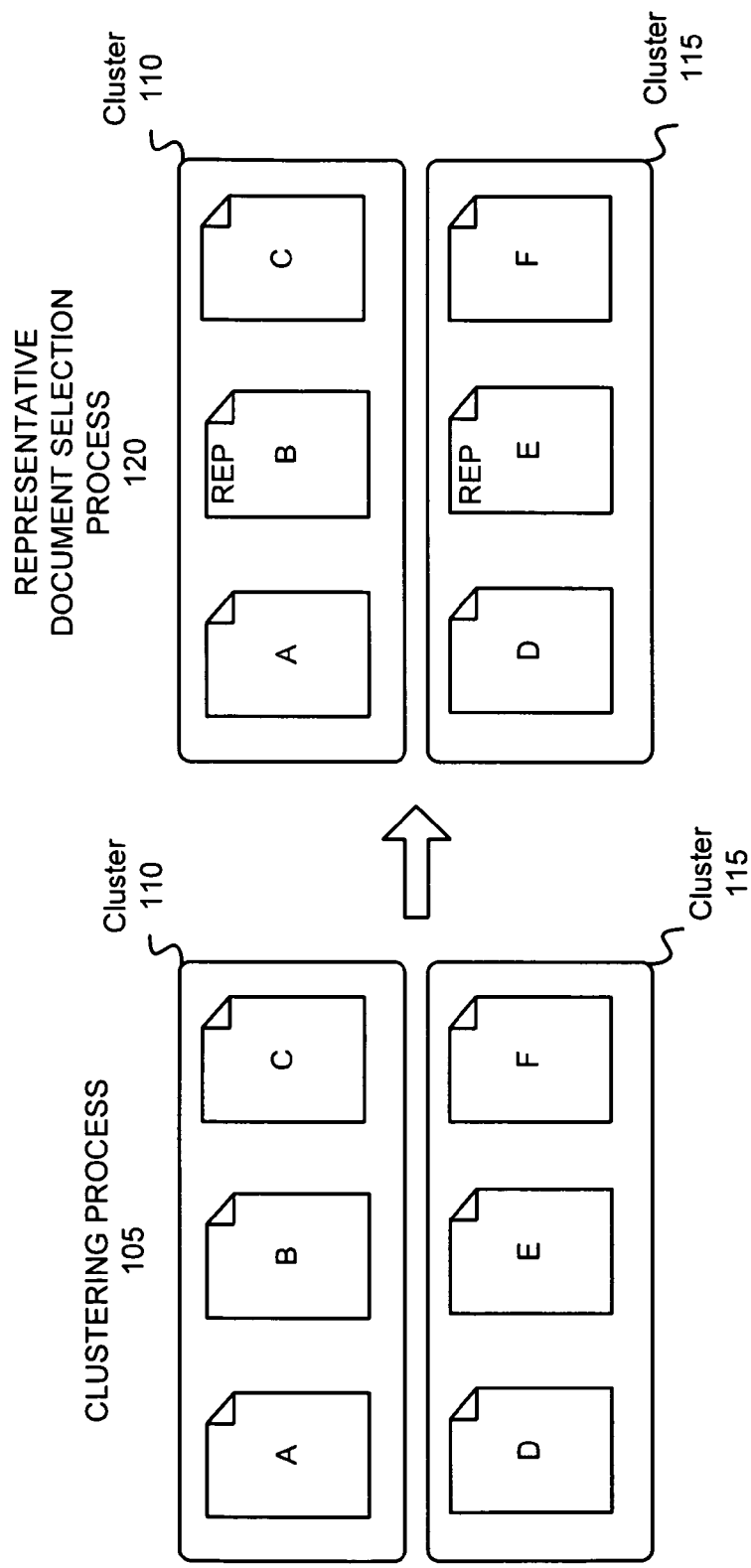
FIGS. 1A and 1B are diagrams illustrating concepts described herein.

The following detailed description of the invention refers to the accompanying drawings. The same reference numbers in different drawings may identify the same or similar elements. Also, the following detailed description does not limit the invention.

In the description to follow, reference will be made to a "document" or "documents." A "document," as the term is used herein, is to be broadly interpreted to include any machine-readable and machine-storable work product. A document may include, for example, an e-mail, content on a web site, a file, a combination of files, one or more files with embedded links to other files, a news group posting, a blog, a business listing, an electronic version of printed text, a web advertisement, an image, a database record, a dynamically generated document, etc. In the context of the Internet, a common form of a "document" is a web page. Web pages often include textual information and may include embedded information (e.g., metadata, images, or hyperlinks) and/or embedded instructions (e.g., JavaScript).

Additionally, in the description to follow, reference will be made to "quality information." "Quality information," as the term is used herein, is to be broadly interpreted to include any information that may be useful in scoring, indexing, or serving a document. For example, quality information may include link information (e.g., a link-based score, a number of links to/from a document, a position of a link within a document, etc.), a date a document is created, a page (or document) rank, anchor text information, an aesthetic value of an address (e.g., a short and/or a word-based URL may have a higher aesthetic value than a long and/or a non-word based URL containing, for example, symbols, such as ?, !, ~, *, etc.), a measure of popularity, information regarding a source of content in the document (e.g., quality of web site that includes the document (e.g., a web site associated with a top-ranked university versus a web site associated with an unknown individual), age of web site that includes the document, etc.), and/or other kinds of information that may indicate whether a document may be a representative.

In the context of indexing, the presence of duplicate documents (i.e., documents with the same or substantially the same content) may lead to wasting resources (e.g., processing, storage, and/or network resources) and degrading a user's search experience. One technique described herein may select one duplicate document, as a "canonical" of a cluster of duplicative documents, to index. This canonical document may then be indexed and/or served as a part of the search results.

Implementations described herein may form clusters of documents and select representative documents from the clusters. This process may be iterated multiple times utilizing different criteria for clustering and/or selecting representative documents in each iteration. The formation of clusters and selection of representative documents may be improved by identifying duplicative relationships.

Figure 1B:
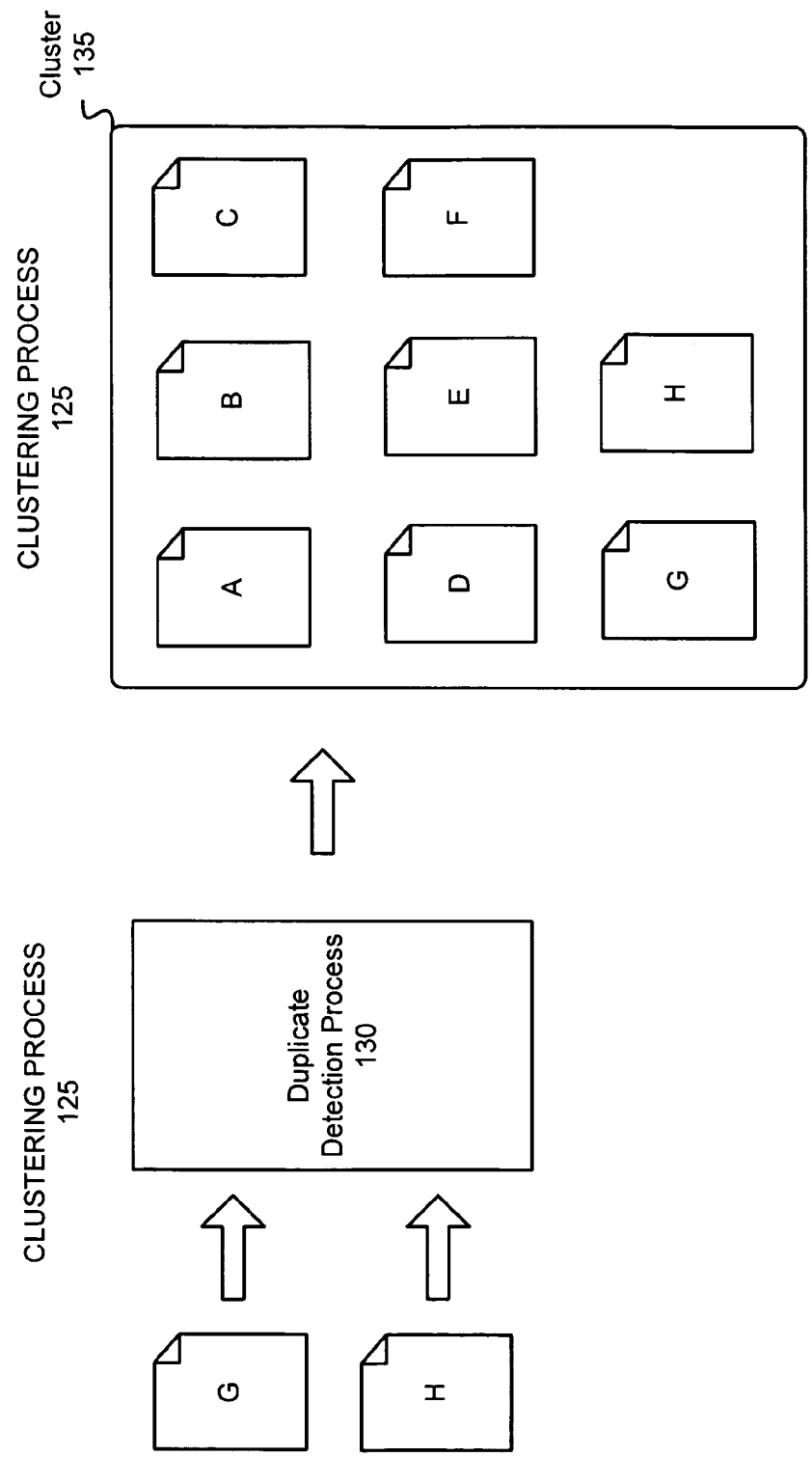

FIGS. 1A and 1B are diagrams illustrating this concept. As illustrated in FIG. 1A, a collection of documents "A," "B," "C," "D," "E," and "F" may be subject to a clustering process 105. As a result of clustering process 105, clusters 110 and cluster 115 may be formed. Cluster 110 may include documents "A," "B," and "C," and cluster 115 may include documents "D," "E," and "F." The documents in each of the respective clusters are considered as having the same or substantially the same content based on one or more criteria associated with clustering process 105.

Subsequent to clustering process 105, a representative document selection process 120 may be performed in which at least one document may be selected as a representative of the cluster. For example, as illustrated, document "B" may be selected as the representative (as indicated by "REP") for cluster 110, and document "E" may be selected as the representative (as indicated by "REP") for cluster 115.

Subsequent to representative document selection process 120, additional clustering processes may be employed based on one or more criteria that may be different than a previous clustering process. In one implementation, redirect information associated with document "B" and document "E" may be utilized to determine target documents. The target documents may provide a basis for the additional clustering processes. In this regard, it may be beneficial to determine whether respective target documents are duplicative documents.

FIG. 1B is a diagram illustrating a subsequent clustering process 125 employing the concepts described herein. As previously described, documents "B" and "E" may be selected as representatives of clusters 105 and 110, respectively. As illustrated, clustering process 125 may determine that documents "G" and "H" are target documents associated with documents "B" and "E," respectively, based on redirect information. A duplicate detection process 130 may also determine whether documents "G" and "H" are duplicate documents based on the addresses (e.g., URLs) associated with documents "G" and "H." It will be appreciated that documents "G" and "H" may have different addresses, but documents "G" and "H" may contain the same, or substantially the same, content.

In this example, duplicate detection process 130 may determine that documents "G" and "H" are duplicate documents. In this regard, clustering process 125 may form a cluster 135 that includes documents "A," "B," "C," "D," "E," "F," "G," and "H." It will be appreciated that if duplicate detection process 130 was not employed, clustering process 125 may have unnecessarily formed two clusters based on documents "G" and "H" (e.g., one cluster including document "G" and another cluster including document "H").

Since the concepts described herein have been broadly described with respect to FIGS. 1A and 1B, it is to be understood that variations exist and will be described below. As a result of the foregoing, the iterative forming of clusters to determine relevant documents to be served in a search result may be significantly improved. More particularly, identifying duplicate documents during the clustering process may significantly improve the quality of documents that may be indexed and presented to a user as a search result.

Exemplary Environment

Figure 2:
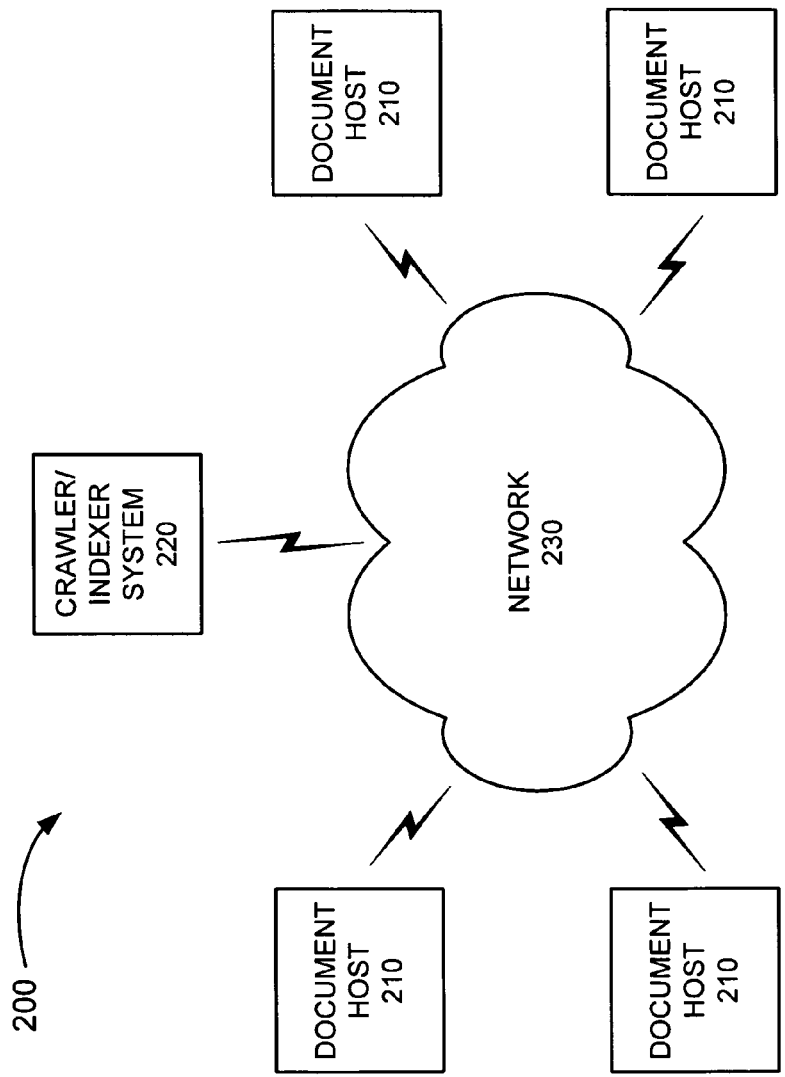
FIG. 2 is a diagram illustrating an exemplary network in which systems and methods described herein may be implemented.

FIG. 2 is a diagram illustrating an exemplary environment 200 in which systems and methods described herein may be implemented. As illustrated, environment 200 may include multiple document hosts 210 connected to a crawler/indexer system 220 via a network 230. In practice, the number of document hosts 210, crawler/indexer system 220, and/or network 230 may be different, as well as the arrangement. Further, one or more document hosts 210 and crawler indexer system 220 may be the same device.

Document hosts 210 may include entities that store and/or manage documents. An entity may be defined, for example, as a device (e.g., a computer, a personal digital assistant (PDA), a telephone, etc.), a process running on a device (e.g., a program, a thread, a fiber), and/or an object executable by a device.

Crawler/indexer system 220 may include an entity that crawls, processes, indexes and/or maintains documents. For example, crawler/indexer system 220 may crawl a corpus of documents, index the documents, and/or store information associated with the documents in a repository of documents.

Crawler/indexer system 220 may be employed as a single entity or as distributed entities.

Network 230 may include, for example, a local area network (LAN), a wide area network (WAN), a telephone network, such as the Public Switched Telephone Network (PSTN) or a cellular network, an intranet, the Internet, and/or a combination of networks. Document hosts 210 and crawler/indexer system 220 may connect to network 230 via wired and/or wireless connections. The connections may either be direct or indirect connections.

Exemplary Crawler/Indexer System Architecture

Figure 3:
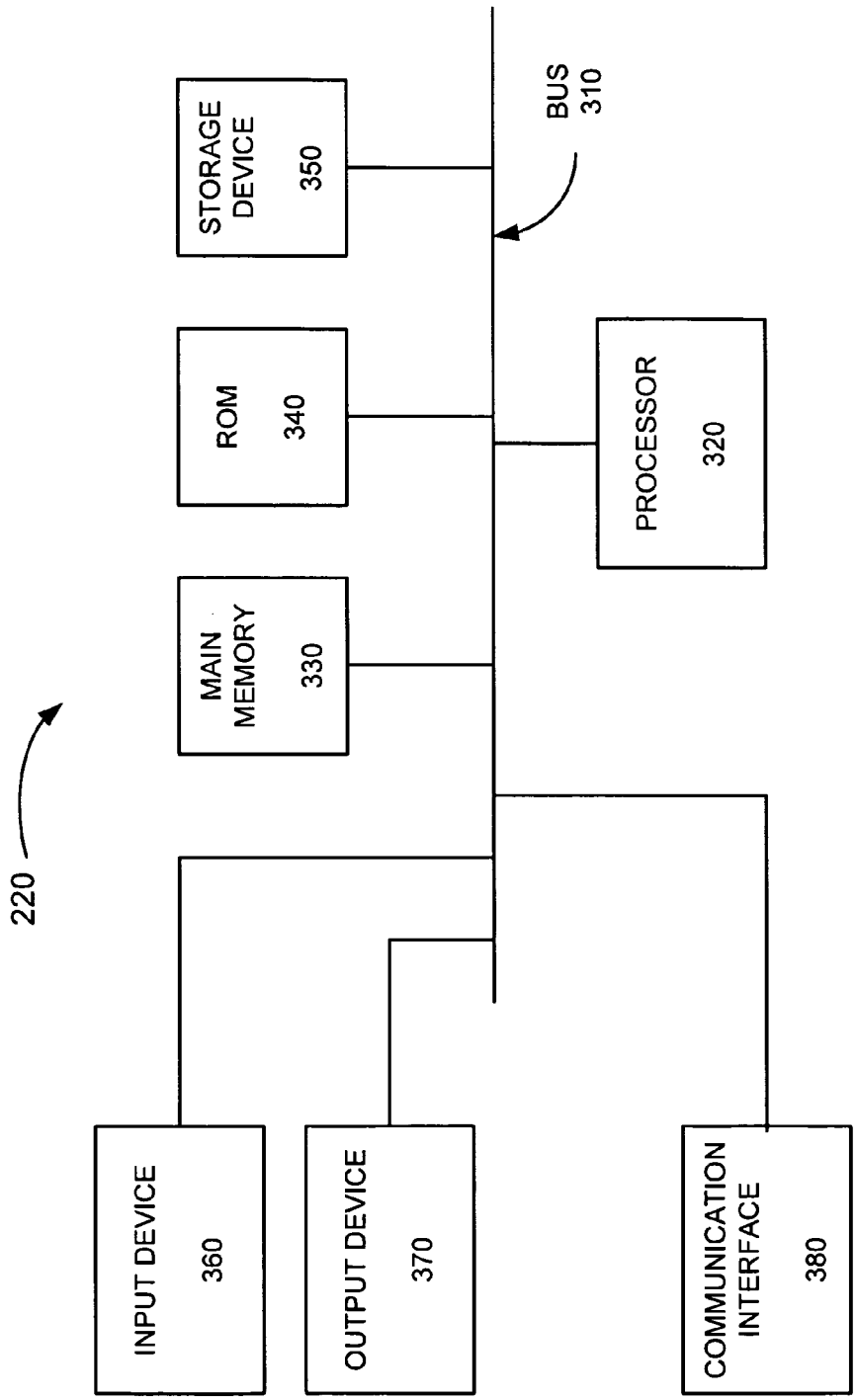
FIG. 3 is a diagram illustrating exemplary components of the crawler/indexer system depicted in FIG. 2.

FIG. 3 is a diagram illustrating exemplary components of crawler/indexer system 220. As illustrated, crawler/indexer system 220 may include a bus 310, a processor 320, a main memory 330, a read only memory (ROM) 340, a storage device 350, an input device 360, an output device 370, and a communication interface 380. The term "component," as used herein, is intended to be broadly interpreted to include software, hardware, or a combination of hardware and software.

Bus 310 may include a path that permits communication among the components of crawler/indexer system 220. Processor 320 may include a processor, microprocessor, or processing logic that may interpret and execute instructions. Main memory 330 may include a random access memory (RAM) or another type of dynamic storage device that may store information and/or instructions for execution by processor 320. ROM 340 may include a ROM device or another type of static storage device that may store static information and/or instructions for execution by processor 320. Storage device 350 may include a magnetic and/or an optical recording medium and its corresponding drive.

Input device 360 may include a component that permits an operator to input information to crawler/indexer system 220, such as a keyboard, a mouse, a pen, voice recognition and/or biometric mechanisms, etc. Output device 370 may include a component that outputs information to an operator, including a display, a printer, a speaker, etc. Communication interface 380 may include any transceiver-like mechanism that enables crawler/indexer system 220 to communicate with other devices and/or systems. For example, communication interface 380 may include components for communicating with another device or system via a network, such as network 230.

Crawler/indexer system 220 may perform certain operations, as will be described in detail below, in response to processor 320 executing software instructions contained in a computer-readable medium, such as memory 330. A computer-readable medium may be defined as a physical or a logical memory device.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes as described herein. Thus, implementations as described herein are not limited to any specific combination of hardware circuitry and software.

Exemplary Crawler/Indexer System Functional Components

Figure 4:
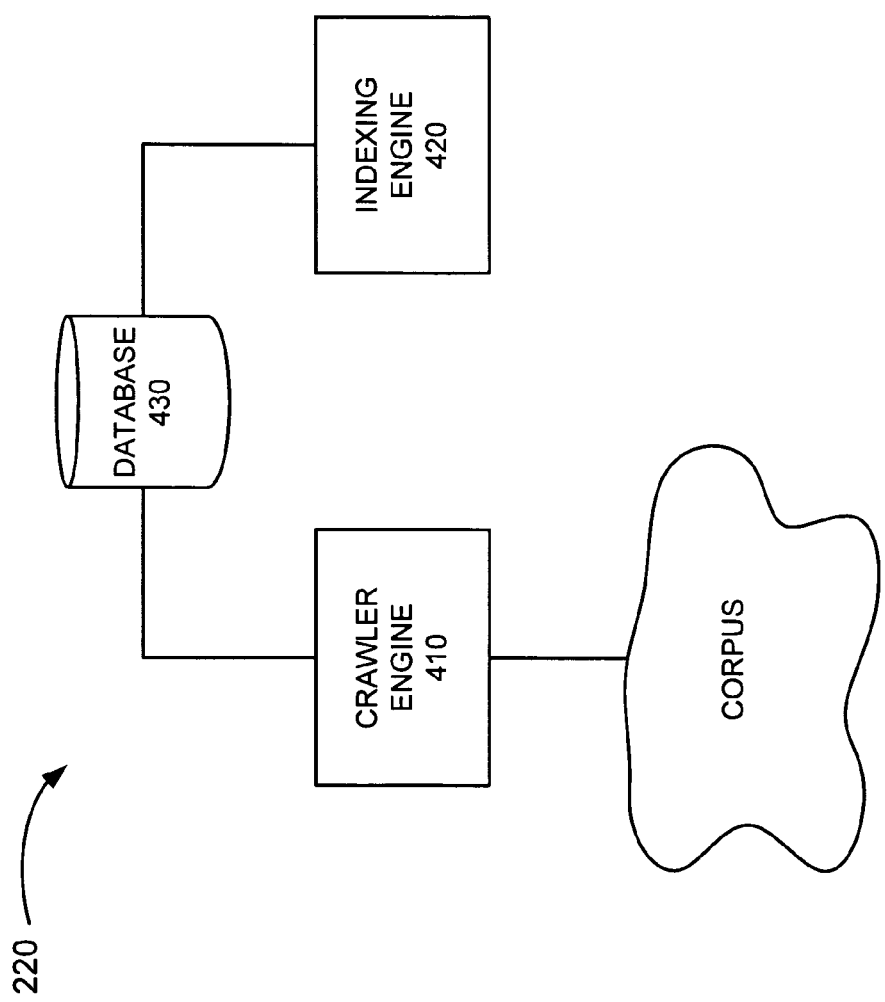
FIG. 4 is a diagram illustrating exemplary functional components of the crawler/indexer system depicted in FIG. 2.

FIG. 4 is a diagram illustrating exemplary functional components of crawler/indexer system 220. As illustrated, crawler/indexer system 220 may include a crawler engine 410, an indexing engine 420 connected to a database 430. While FIG. 4 illustrates these functional components within crawler/indexer system 220, in other implementations, crawler engine 410, indexing engine 420, and/or database 430 may be implemented partially or wholly within another device or a group of devices, including or excluding, crawler/indexer system 220.

Crawler engine 410 may operate from a list of addresses to fetch the corresponding documents from a corpus of documents (e.g., the web). Crawler engine 410 may extract the addresses associated with the outgoing links in the document and add the addresses to the list of addresses to be crawled. Crawler engine 410 may also store information associated with the document, such as all or part of the document, including quality information, in database 430.

Indexing engine 420 may process documents provided by crawler engine 410. For example, indexing engine 420 may create an index of the documents and store the index in database 430. Indexing engine 420 may form clusters of duplicate documents. Indexing engine 420 may also select a representative document from each cluster. Indexing engine 420 may perform these operations iteratively.

Database 430 may be embodied within a single memory device, within multiple (possibly distributed) memory devices, and/or within a single or multiple storage devices. Database 430 may store various types of information, such as a list of addresses used by crawler engine 410, information associated with documents crawled by crawler engine 410, and/or an index generated by indexing engine 420.

Exemplary Crawler Engine Functional Components

Figure 5:
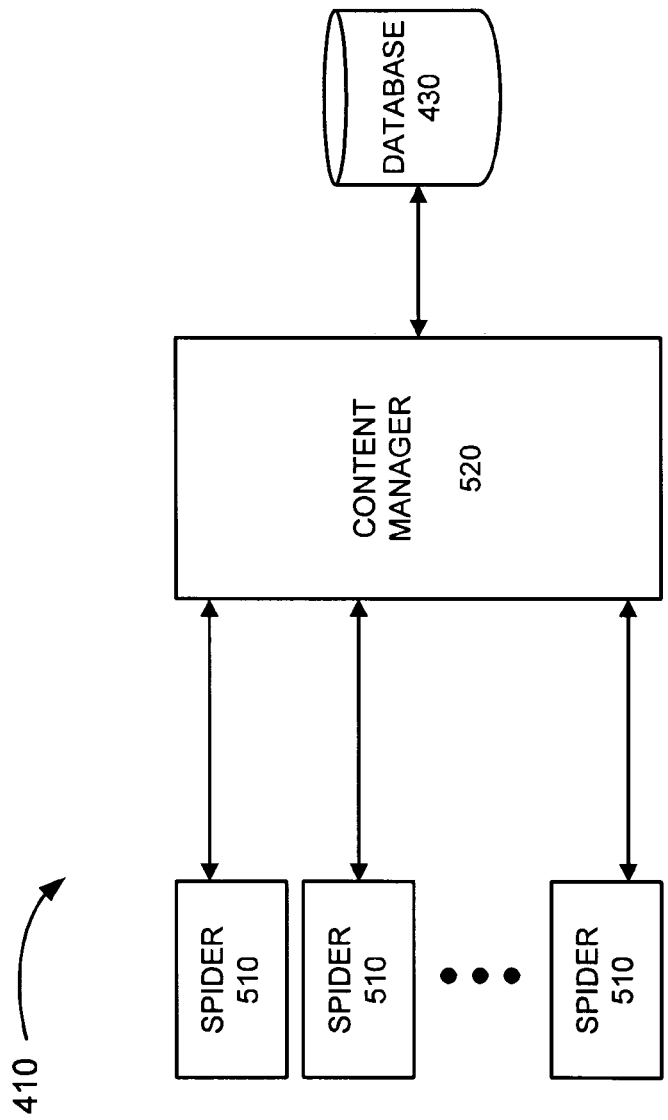
FIG. 5 is a diagram illustrating exemplary functional components of the crawler engine depicted in FIG. 4.

FIG. 5 is a diagram illustrating exemplary functional components of crawler engine 410. As illustrated, crawler engine 410 may include spiders 510 and a content manager 520. While FIG. 5 illustrates these functional components within crawler/indexer system 220, in other implementations, spiders 510 and/or content manager 520 may be implemented partially or wholly within another device or a group of devices, including or excluding, crawler/indexer system 220.

A spider 510 may access a document from a corpus of documents and provide the document to a content manager 520. In some instances, spider 510 may refer to, for example, a robots.txt file. Spiders 510 may operate from a list of addresses provided by content manager 520. Spiders 510 may re-visit documents from the corpus for updates or changing information based on re-visit policies (e.g., refresh policies, politeness policies, load on a given host, rate limits, etc.). In this regard, in some instances, documents may be re-visited at different times and/or frequencies.

Content manager 520 may parse a document crawled by a spider 510 to identify, among other things, outgoing links that the document contains. Content manager 520 may add addresses associated with the outgoing links to a list of addresses that it maintains. Content manger 520 may provide addresses from the list to spiders 510 as instructions for spiders 510 to crawl the corresponding documents. Content manager 520 may also store the information associated with the documents (e.g., all or a part thereof), including quality information, in database 430.

Exemplary Indexing Engine Functional Components

Figure 6:
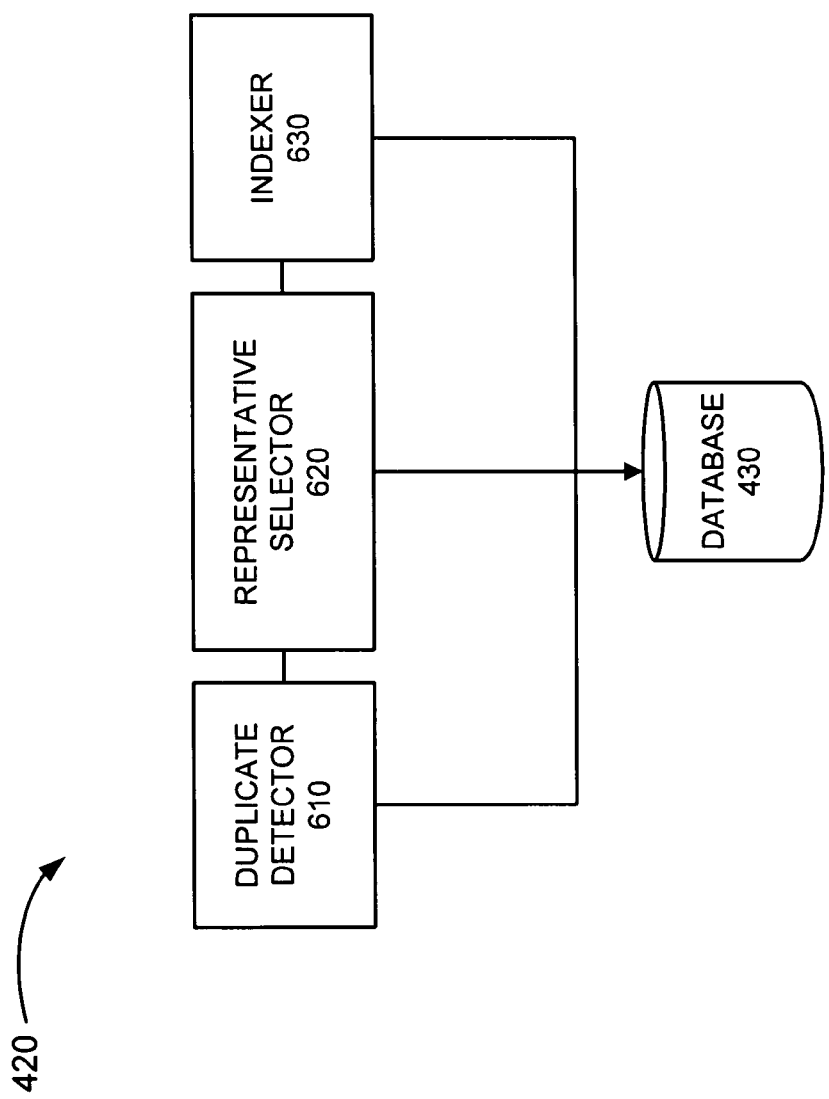
FIG. 6 is a diagram illustrating exemplary functional components of the indexing engine depicted in FIG. 4.

FIG. 6 is a diagram illustrating exemplary functional components of indexing engine 420. As illustrated, indexing engine 420 may include a duplicate detector 610, a representative selector 620, and an indexer 630. While FIG. 6 illustrates these functional components within crawler/indexer system 220, in other implementations, duplicate detector 610, representative selector 620, and/or indexer 630 may be implemented partially or wholly within another device or a group of devices, including or excluding, crawler/indexer system 220.

Duplicate detector 610 may include one or more clustering algorithms or decision processes for determining whether two documents are duplicates (including substantial duplicates) of each other. These clustering algorithms or decision processes may employ one or more criteria to cluster (i.e., group) documents. In general, the criteria for determining duplicate documents may include content-based clustering and/or predictive clustering.

Content-based clustering may require analysis of the contents of the documents. For example, duplicate detector 610 may compute a checksum or a hash over the content or a portion of the content of a document. In this instance, two documents that share the same checksum value (or checksum ID) may be considered duplicates of each other.

Another example of a content-based clustering may involve analyzing redirect information. Redirection is a technique for making a document available under more than one address (e.g., URL). Generally, a redirect causes a browser to change from a source address to a target address. There are many types of redirects. For example, there are manual redirects, status code redirects (e.g., Hypertext Transfer Protocol (HTTP) status codes 301 or 302), meta refresh redirects, or JavaScript redirects. If a source document redirects to a target document, then the source document and the target document may be considered duplicates of each other, may be clustered together, and may share the same target ID. In many cases, a target document may have multiple sources (i.e., multiple source documents may redirect to the same target document). For example, document "A" may redirect to document "C," and document "B" may redirect to document "C."

In one implementation, the target document may correspond to a final target document. That is, a concatenation of redirects may include an intermediary target document, which may not constitute a final target document. For example, document "A" (a source document) may redirect to document "B," which in turn may redirect to document "C." In this regard, document "B" may be considered the intermediary target document (or a source document), while document "C" may be considered the final target document.

In other instances, a document may not be associated with a source document and may not be considered a (final) target document. For example, document "A" may not have another document (e.g., a source document) that redirects to document "A." In such instances, document "A" may be considered a content document, but not a (final) target document. Thus, a final target document and a content document may be distinguished based on a presence or an absence of a source document.

Predictive-based clustering may identify duplicate documents without analyzing the contents of the documents. For example, predictive-based clustering may involve computing checksums or hashes over documents of a web site, a directory, a subdirectory, or a combination of address parameters, and generating a set of rules that given an address, assigns a predictive identifier (ID) for the document associated with the address. The predictive ID may then be utilized to determine whether two documents are duplicates. Additionally, or alternatively, other sets of rules may be generated for a web site, a directory, a sub-directory, or an address parameter combination. In some cases, these rules may include a list of address prefixes that have been determined as being equivalents of each other. An example of this may include a rule that specifies that www.mysite.com and www.planetearth.com/mysite are equivalents of each other. Thus, address pairs such as www.mysite.com/document and www.planetearth.com/mysite/document, or www.mysite.com/index and www.planetearth.com/mysite/index, etc., may be mapped to the same predictive ID, respectively.

In other instances, the rules may specify that a portion of an address is unimportant, and may be ignored when considering whether two addresses are equivalent. For example, a rule may specify that a session identifier within an address does not matter. In this case, for example, the rule may consider the addresses www.forum.com/posts?postid=110&sid=165 and www.forum.com/posts?postid=110&sid=166 to be associated with duplicate documents. In another case, for example, the rule may consider the addresses www.forum.com/posts/postid=110/sid=165 and www.forum.com/posts/postid=110/sid=166 to be associated with duplicate documents. Thus, duplicate detector 610 may assign each document with the same predictive ID.

Depending on the key generated (e.g., checksum ID, predictive ID, or target ID) for a document, duplicate detector 610 may determine whether the document belongs to an existing cluster or forms a new cluster. Thus, a cluster may include one document, thousands of documents, or millions of documents, sharing the same key. Duplicate detector 610 may store information regarding a cluster to which a document belongs in, for example, database 430.

Representative selector 620 may process each cluster in a set of clusters to select a representative document. For example, representative selector 620 may rank the documents in a cluster in some manner to create a ranked list. In one implementation, representative selector 620 may utilize information that reflects a measure of quality of the documents to rank the documents. For example, representative selector 620 may utilize quality information as a measure of quality and/or some other type of information as a measure of quality. Representative selector 620 may store information associated with representatives in, for example, database 430. The information stored may include quality information.

Indexer 630 may index one or more top-ranked documents (referred to as "canonicals") from each of the ranked lists. For example, indexer 630 may take the text or other data of a top-ranked document in a ranked list, extract individual terms or other data from the text of the document, and sort those terms or other data (e.g., alphabetically) in an index. Other techniques for extracting and indexing content, that are more than simple word-level indexing, may also or alternatively be used, including techniques for indexing Extensible Markup Language (XML) data, images, videos, etc. Each entity in the index may contain a term or other data stored in association with a list of documents in which the term or other data appears and the location within the document where the term or other data appears.

Exemplary Process of Determining Clusters and Representatives

Figure 7A:
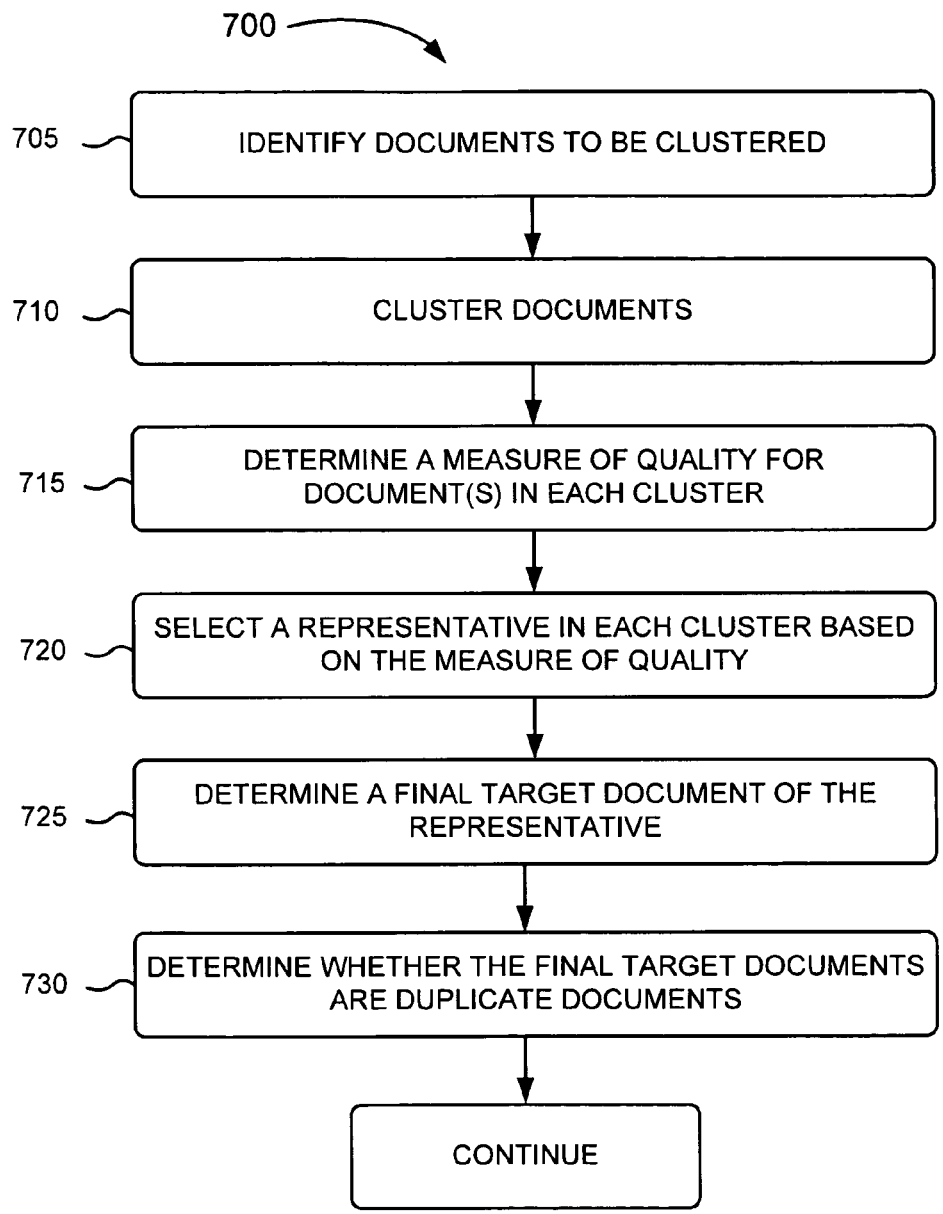
FIGS. 7A and 7B are flow diagrams illustrating an exemplary process for determining clusters and representatives.
Figure 7B:
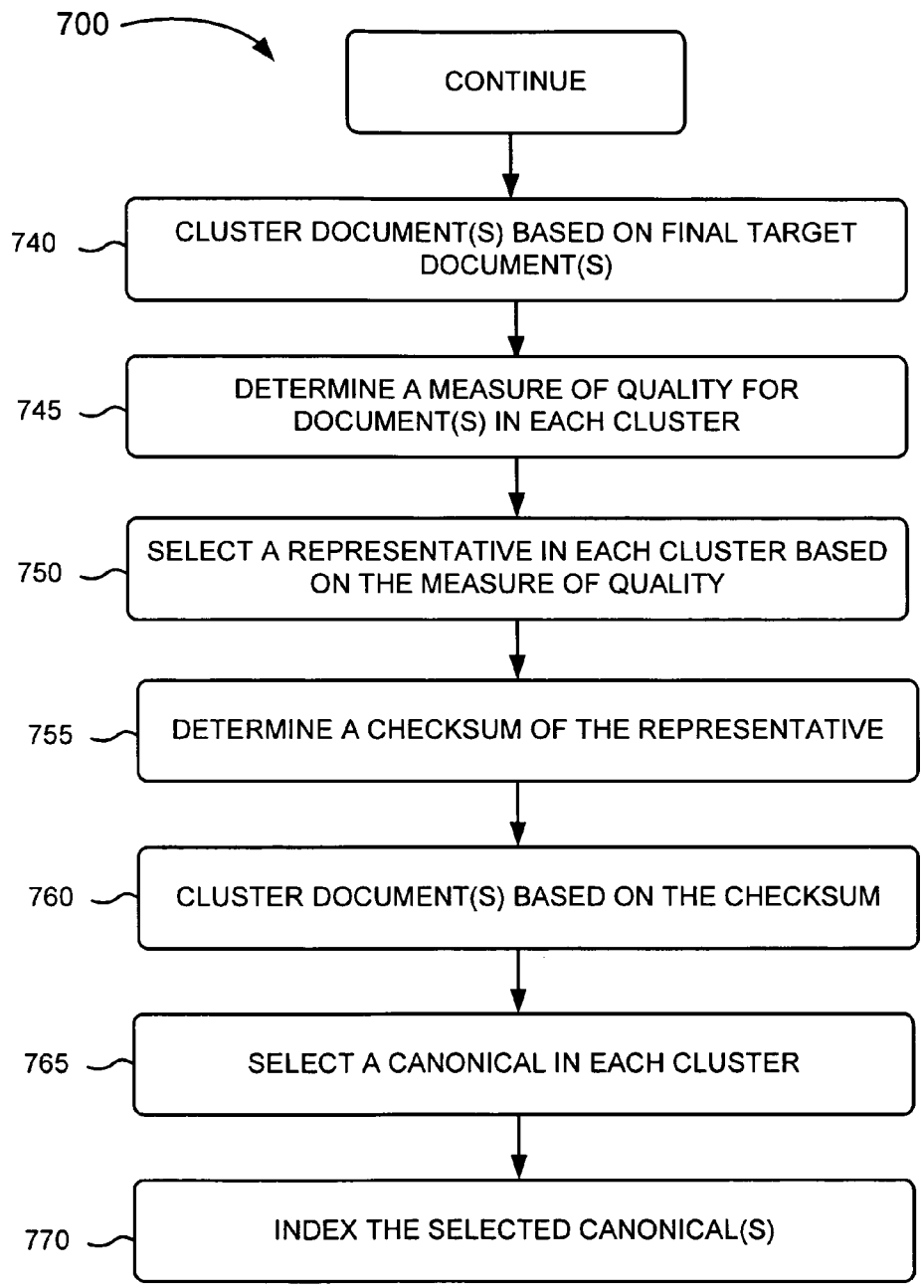

FIGS. 7A and 7B are flowcharts illustrating an exemplary process 700 for determining clusters and representatives. In one implementation, process 700 may be performed by indexing engine 420. In other implementations, process 700 may be performed wholly or partially by one or more other components, including or excluding, indexing engine 420.

As illustrated in FIG. 7A, process 700 may begin with identifying documents to be clustered (block 705). For example, indexing engine 420 may index information stored in a repository (e.g., database 430). In such an instance, indexing engine 420 may identify documents to be clustered. In other instances, indexing engine 420 may identify documents to be clustered for other reasons.

Figure 8:
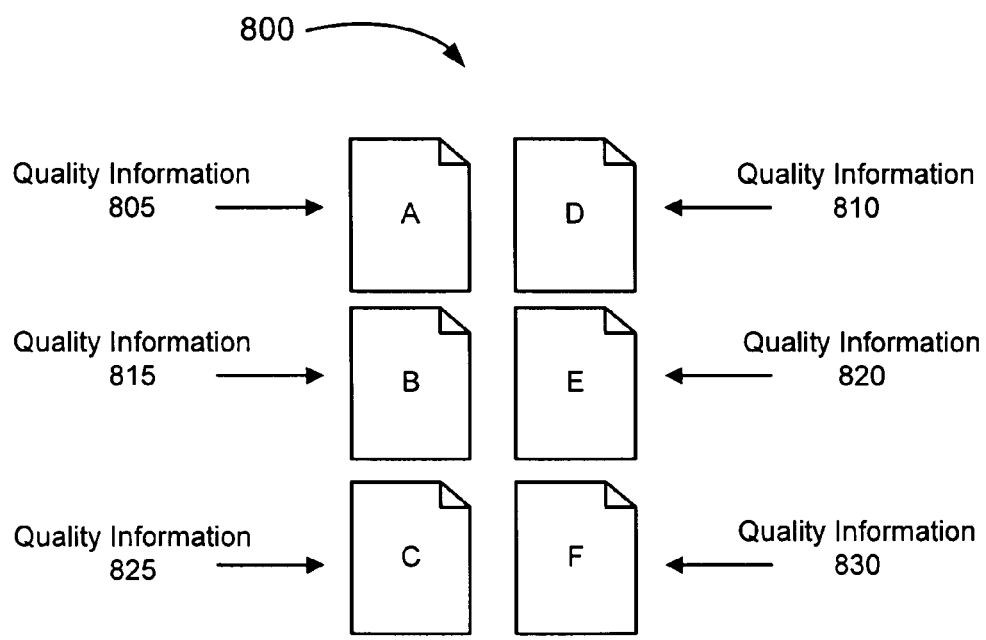

For discussion and illustration purposes, consider that documents 800 ("A," "B,", "C," "D," "E," and "F") correspond to a subset of the identified documents to be clustered, as illustrated in FIG. 8. Quality information 805, 810, 815, 820, 825 and 830 may be associated with documents "A," "B," "C," "D," "E," and "F," respectively.

Returning to FIG. 7A, the documents may be clustered (block 710). Duplicate detector 610 may cluster the identified documents. For example, documents 800 may be clustered based on a content-based clustering technique or a predictive-based clustering technique. In still other implementations, duplicate detector 610 may cluster documents 800 based on a combination of a content-based clustering technique and a predictive-based clustering technique, and/or some other type of clustering technique not specifically mentioned herein.

Figure 9:
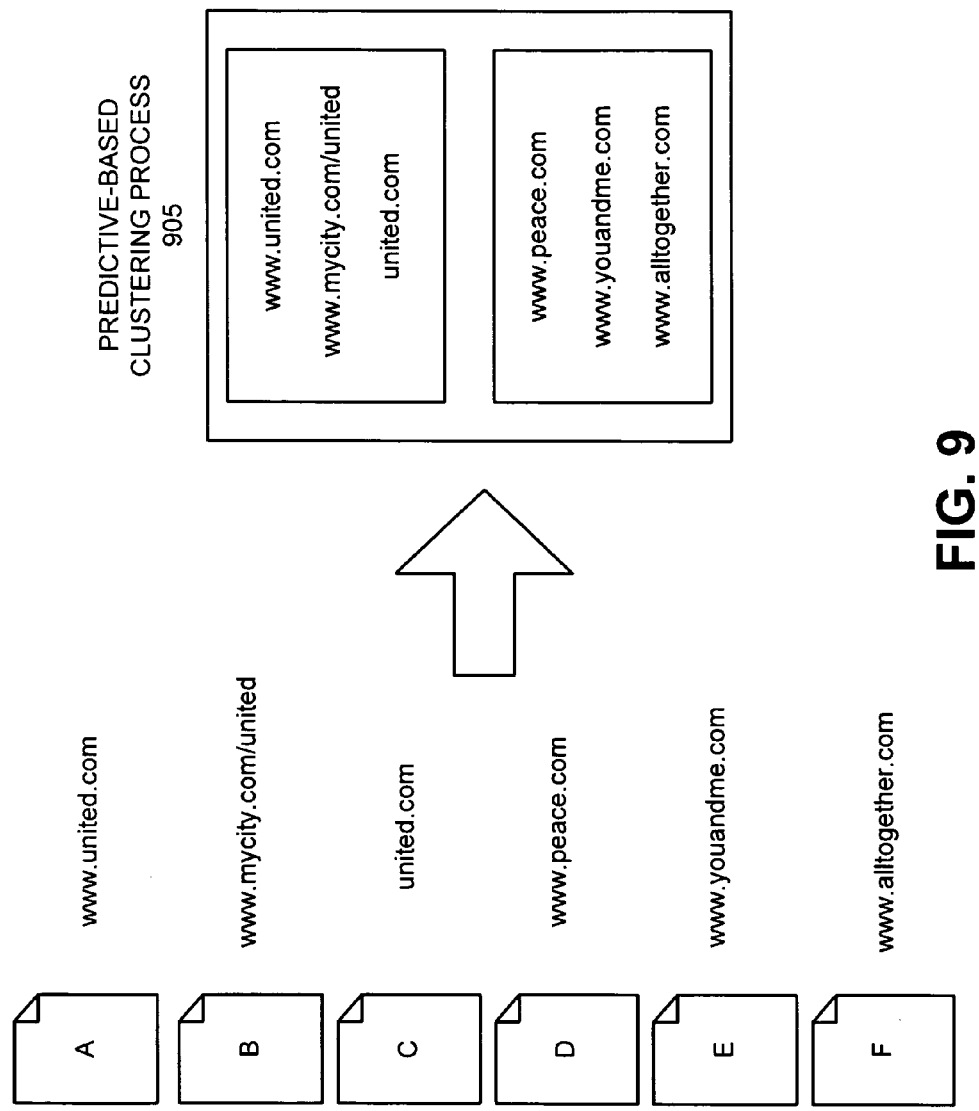

For purposes of discussion, in one implementation, duplicate detector 610 may cluster documents 800 based on a predictive-based clustering technique. FIG. 9 illustrates an exemplary predictive-based clustering technique. As illustrated, documents "A," "B," "C," "D," "E," and "F," may have a corresponding address (e.g., a URL). For example, the URL for document "A" may be www.united.com, the URL for document "B" may be www.mycity.com/united, and the URL for document "C" may be united.com, the URL for document "D" may be www.peace.com, the URL for document "E" may be www.youandme.com, and the URL for document "F" may be www.altogether.com. Based on the respective URLs associated with documents "A," "B," "C," "D," "E," and "F," predictive-based clustering process 905 may cluster these documents. For example, predictive-based clustering process 905 may determine that URLs www.united.com, www.mycity.com/united, and united.com have the same predictive ID and, thus are duplicate documents. Similarly, predictive-based clustering process 905 may determine that URLs www.peace.com, www.youandme.com, and www.altogether.com have the same predictive ID and, thus are duplicate documents.

Figure 10:
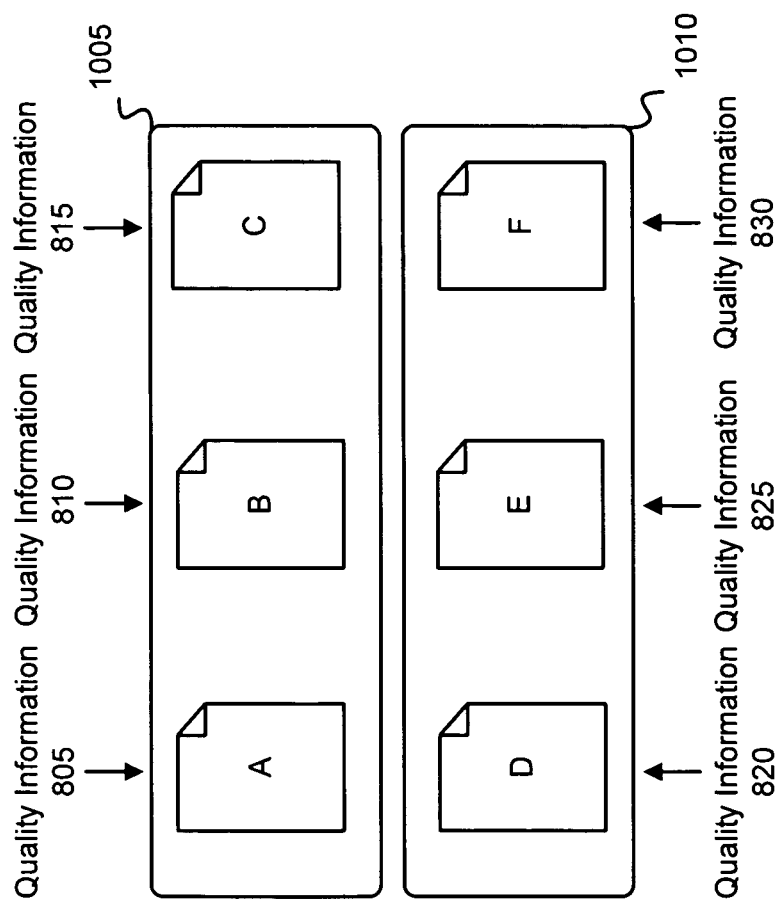

As a result of predictive-based clustering process 905, duplicate detector 610 may form clusters 1005 and 1010, as illustrated in FIG. 10. Cluster 1005 may include documents "A," "B," and "C," and cluster 1010 may include documents "D," "E," and "F." In such an instance, documents "A," "B," and "C" may share a common key value (e.g., a predictive ID) and documents "D," "E," and "F" may share a common key value (e.g., a predictive ID). Quality information 805, 810, 815, 820, 825, and 830 may remain associated with their respective documents.

Returning to FIG. 7A, a measure of quality may be determined for document(s) in each cluster (block 715). In one implementation, a measure of quality (e.g., a quality score) for each document may be determined. The measure of quality for a document may be based on quality information. For example, representative selector 620 may determine the quality score for each document based on quality information 805, 810, 815, 820, 825, and 830. As previously described, quality information may include link information (e.g., a link-based score, a number of links to/from a document, a position of a link within a document, etc.), a date a document is created, a page (or document) rank, anchor text information, an aesthetic value of an address (e.g., a short and/or a word-based URL may have a higher aesthetic value than a long and/or a non-word based URL containing, for example, symbols, such as ?, !, ~, *, etc.), a measure of popularity, information regarding a source of content in the document (e.g., quality of web site that includes the document (e.g., a web site associated with a top-ranked university versus a web site associated with an unknown individual), age of web site that includes the document, etc.), and/or other kinds of information that may indicate whether a document may be a good representative.

A representative document for each cluster may be selected based on the measure of quality (block 720). For example, representative selector 620 may determine a representative for each cluster based on the measure of quality (e.g., a quality score) associated with each document. In one implementation, representative selector 620 may select a document having the highest quality score in a cluster as the representative document of the cluster.

Figure 11:
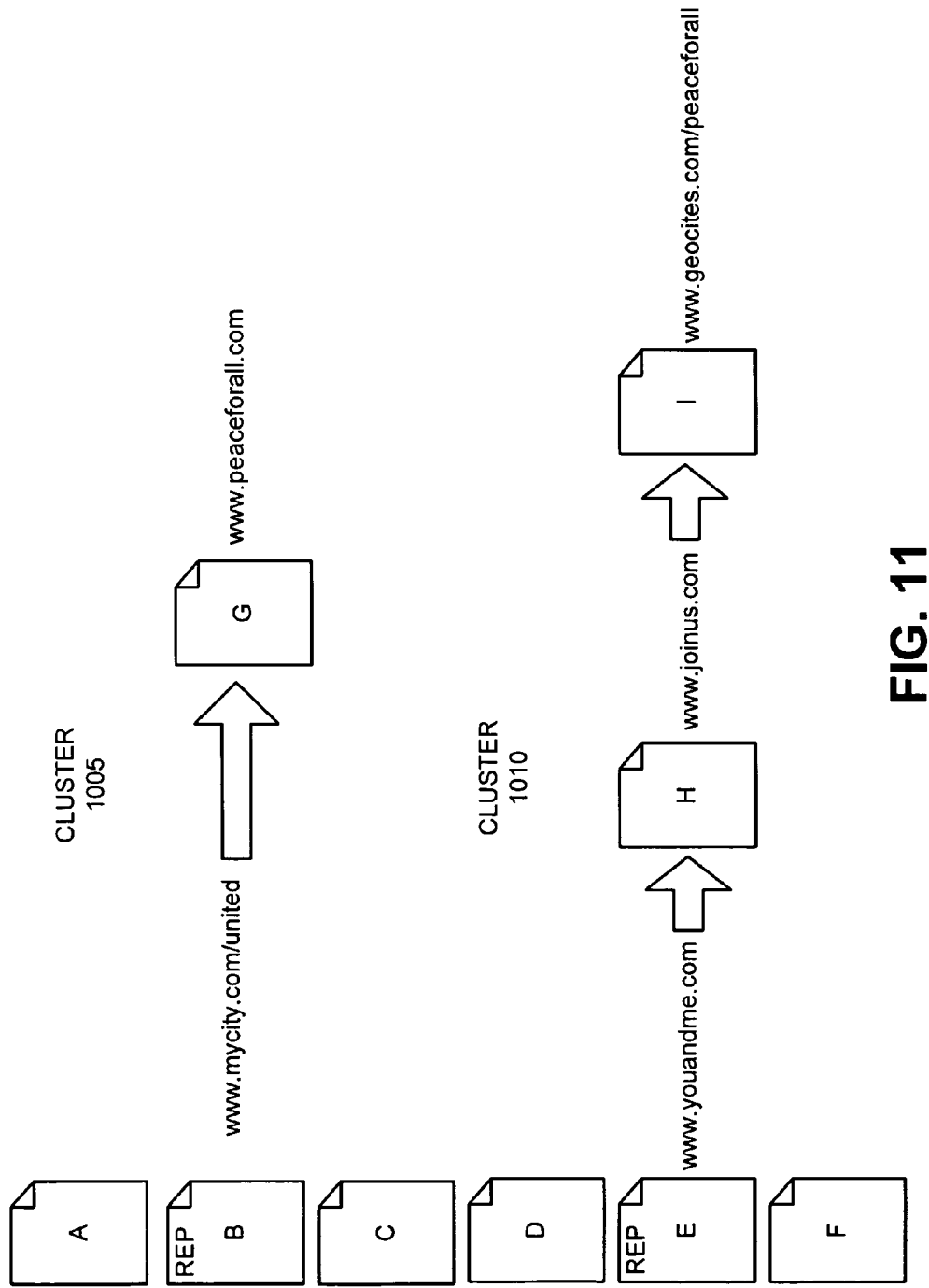

FIG. 11 is a diagram illustrating this exemplary operation. As illustrated, for example, representative selector 620 may select document "B" as the representative (as indicated by "REP") in cluster 1005, and may select document "E" as the representative (as indicated by "REP") in cluster 1010.

Returning to FIG. 7A, a final target document associated with the representative may be determined (block 725). For example, duplicate detector 610 may determine a final target document that may be associated with the representative for each cluster. In one implementation, duplicate detector 610 may analyze the redirect information associated with the representative document. In some instances, the representative may not redirect to another document. In such instances, the final target document may correspond to the representative document itself. In other instances, the representative may redirect to another document. In such instances, duplicate detector 610 may determine a final target document associated with the representative.

Returning to FIG. 11, in this example, representative selector 620 may determine that document "G" is the final target document for representative document "B," and document "I" is the final target document for representative document "E." Document "G" may have an address (e.g., a URL) of www.peaceforall.com and document "I" may have an address (e.g., a URL) of www.geocites.com/peaceforall. Document "H" may be considered an intermediate target document.

Figure 12:
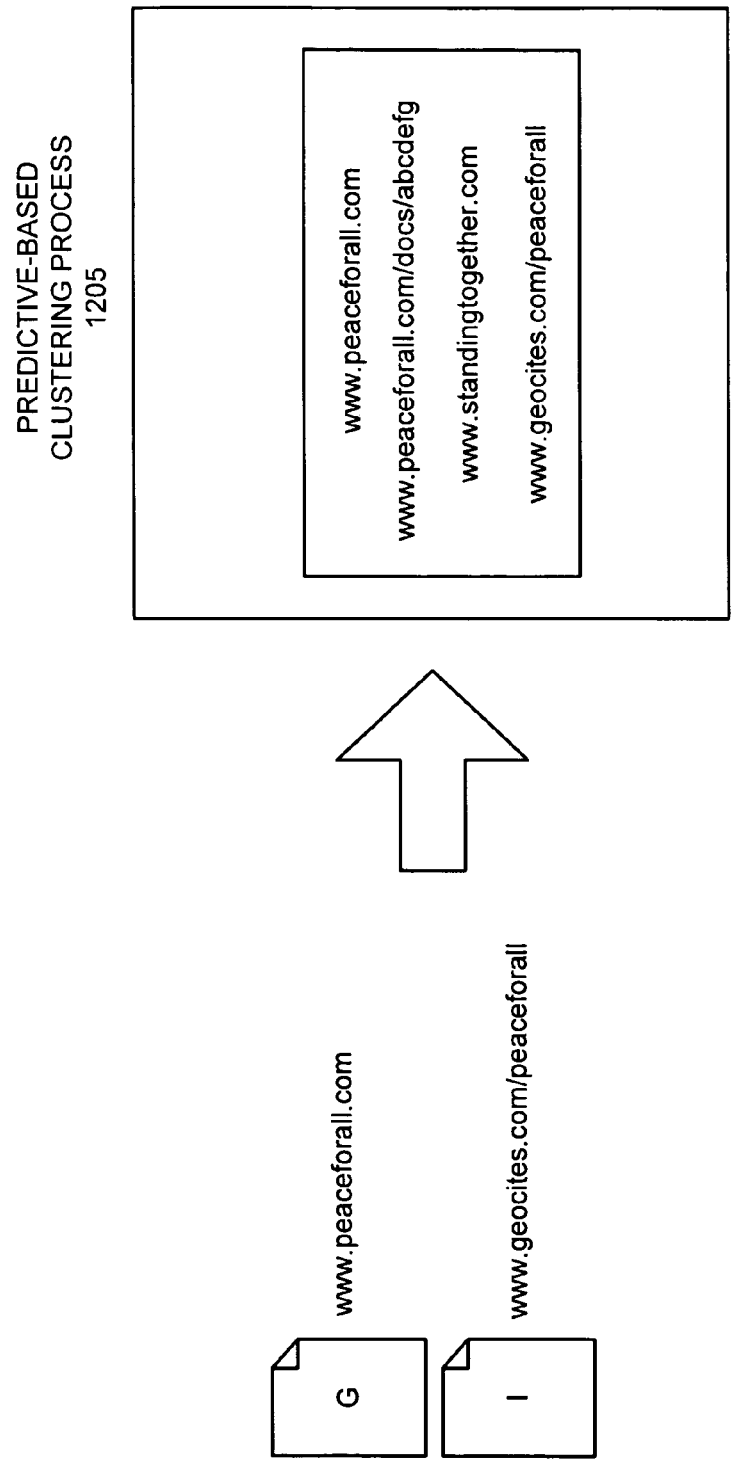

Returning to FIG. 7A, determine whether the final target documents are duplicate documents (block 730). For example, duplicate detector 610 may apply the predictive-based clustering technique previously described above. Referring to FIG. 12, predictive-based clustering process 1205 may be applied to documents "G" and "I" to determine whether documents "G" and "I" are duplicate documents.

In some instances, predictive-based clustering process 1205 may determine that documents "G" and "I" are not duplicate documents (e.g., they have different predictive IDs). In other instances, predictive-based clustering process 1205 may determine that documents "G" and "I" are duplicate documents (e.g., they have the same predictive ID). For purposes of discussion, assume that predictive-based clustering process 1205 determines that documents "G" and "I" are duplicate documents. That is, as illustrated in FIG. 12, predictive-based clustering process 1205 provides that, among other addresses, www.peaceforall.com and www.geocites.com/peaceforall have the same predictive ID.

Figure 13:
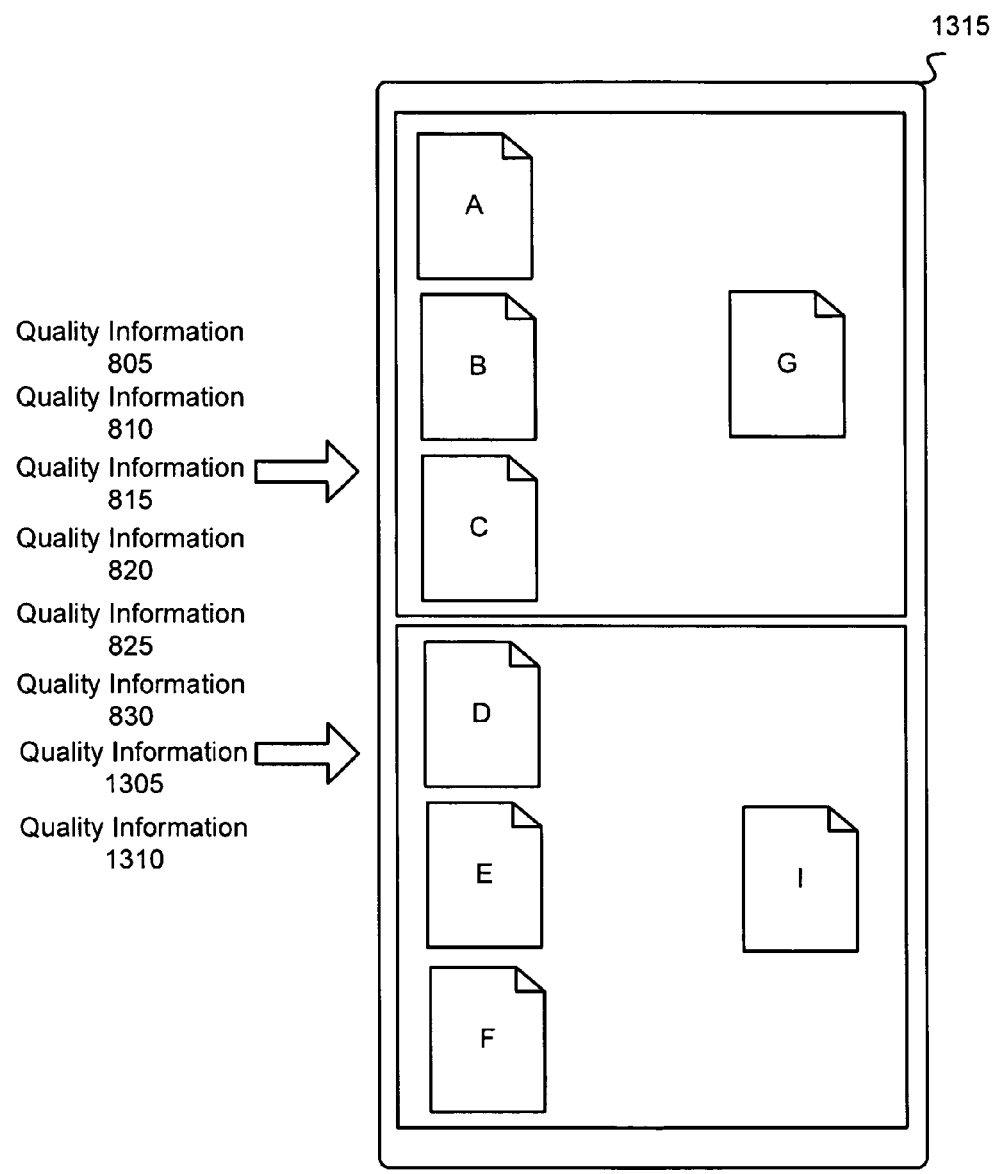

Referring to FIG. 7B, process 700 may continue with documents being clustered based on the final target document(s) (block 740). For example, duplicate detector 610 may cluster documents that are associated with the same or equivalent final target document. FIG. 13 illustrates an example of this process. As illustrated, documents "A," "B," "C," and "G" may be clustered with documents "D," "E," "F," and "I" to form a cluster 1315. As further illustrated in FIG. 13, quality information 1305 and 1310 may be associated with documents "G" and "I," respectively.

As previously described, for this example case, documents "G" and "I" are considered duplicate documents. In other instances, for example, where documents "G" and "I" are not considered duplicate documents, cluster 1315 may include, for example, documents "A," "B," "C," and "G," and documents "D," "E," "F," and "I" may be clustered in another cluster.

Referring back to FIG. 7B, a measure of quality may be determined for document(s) in each cluster (block 745). Similar to block 715, a measure of quality for each document may be determined. The measure of quality for a document may be based on quality information. For example, representative selector 620 may determine the quality score for each document based on quality information 805, 810, 815, 820, 825, 830, 1305, and 1310.

Figure 14:
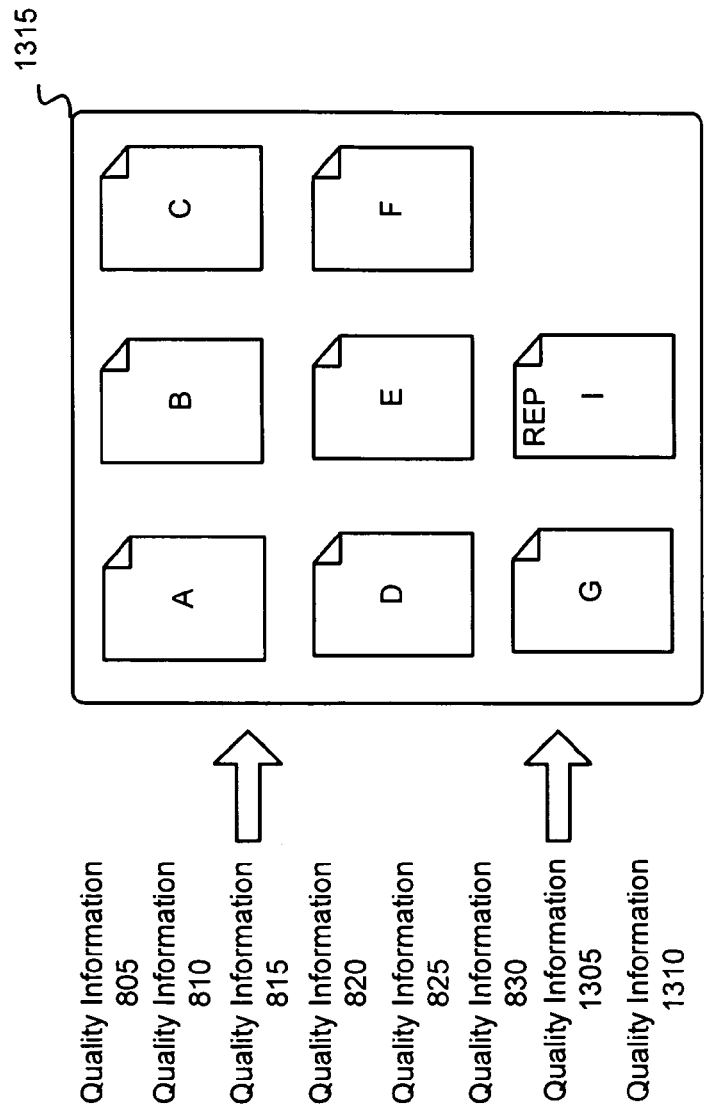

A representative document for each cluster may be selected based on the measure of quality (block 750). For example, representative selector 620 may determine a representative for each cluster based on the measure of quality (e.g., a quality score) associated with each document. In one implementation, representative selector 620 may select a document having the highest quality score in a cluster as the representative document of the cluster. For example, as illustrated in FIG. 14, representative selector 620 may determine that document "I" is the representative document (as indicated by "REP").

Referring to FIG. 7B, a checksum of the representative may be determined (block 755). For example, duplicate detector 610 may determine a checksum of the representative in each cluster. In this example, the checksum for document "I" may be determined.

Documents may be clustered based on the checksum of the representative (block 760). For example, duplicate detector 610 may cluster documents based on the checksum of the representative document. FIG. 15 illustrates an example of this process. For purposes of discussion and illustration, assume that documents "J," "K," and "L" are determined to have the same checksum as document "I." Document "L" may be a representative document (as indicated by "REP"). Cluster 1520 may include documents "A," "B," "C," "D," "E," "F," "G," "I," "J," "K," and "L." Quality information 1505, 1510, and 1515 may be associated with documents "J," "K," and "L," respectively.

Returning to FIG. 7B, a canonical in each cluster may be selected (block 765). For example, indexing engine 430 may select a document, or a set of documents, as the "canonical" for the cluster. A "canonical" document may be considered similar to a representative. However, the selection of a canonical document may involve processes in addition to and/or different than those described with respect to selecting a representative. In one implementation, indexing engine 430 may select the highest ranking document as the canonical for the cluster.

The canonical may be indexed (block 770). For example, in one implementation, indexing engine 420 (e.g., indexer 630) may take the text or other data of the canonical document, extract individual terms or other data from the text of the canonical document, and sort those terms or other data (e.g., alphabetically) in an index. Other techniques for extracting and indexing content, that are more complex than simple word-level indexing, may also or alternatively be used, including techniques for indexing XML data, images, videos, etc. Each entry in the index may contain a term or other data stored in association with a list of documents in which the term or other data appears and the location within the document where the term or other data appears. Additionally, in one implementation, quality information associated with all or select documents of the cluster from which the canonical document was selected may be associated with the canonical document and indexed.

It will be appreciated that a clustering process, a representative selection process, a canonical selection process, or some other indexing process relating to a collection of documents, including or excluding documents 800, may precede process 700. Additionally, or alternatively, it will be appreciated that a clustering process, a representative selection process, a canonical selection process, or some other indexing process relating to a collection of documents, including or excluding documents 800, may succeed process 700.

It will also be appreciated that a clustering process preceding and/or succeeding process 700 may utilize a different type of clustering than the type of clustering utilized during process 700. For example, if process 700 utilizes a content-based clustering technique, then a clustering process preceding and/or succeeding process 700 may utilize a predictive-based clustering technique. In other implementations, the clustering techniques preceding and/or succeeding process 700 may utilize a clustering process identical to a clustering process performed during process 700, or similar thereto (e.g., a content-based clustering technique (e.g., checksum ID) during process 700 and a content-based clustering technique (e.g., target ID) preceding and/or succeeding process 700).

It will also be appreciated that one or more of the operations described in connection to process 700 may be omitted. For example, one or more of the operations, such as, clustering, determining a measure of quality, selecting a representative, etc., may be omitted depending on the number of iterations performed. Additionally, or alternatively, criteria associated with these processes may be different in other implementations. For example, blocks 755 and 760 may involve clustering based on a predictive-based clustering technique instead of a content-based clustering technique.

CONCLUSION

Implementations described herein may facilitate the indexing process and the quality of search results by significantly improving the clustering of duplicate documents.

The foregoing description provides illustration and description, but is not intended to be exhaustive or to limit the invention to the precise form disclosed. Modifications and variations are possible in light of the above teachings or may be acquired from practice of the teachings.

In addition, while a series of blocks has been described with regard to FIGS. 7A and 7B, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" or "an" is intended to include one or more items. Where only one item is intended, the term "one" or similar language is used. Further, the phrase "based on" is intended to mean "based, at least in part, on" unless explicitly stated otherwise.

The term "may" is used throughout this application and is intended to be interpreted as "having the potential to," or "being able to," and not in a mandatory sense (e.g., as "must"). The term "and/or" is intended to be interpreted to include any and all combinations of one or more of the associated list items.

What is claimed is:

1. An automated method, comprising:
   clustering documents into a first subset and a second subset, where documents in the first subset are duplicative, and where documents in the second subset are duplicative to one another and differ from the documents in the first subset;
   selecting a first representative document and a second representative document, where the first representative document is selected from the first subset, and where the second representative document is selected from the second subset;
   determining a first redirect target document and a second redirect target document, where the first redirect target document is referenced by the first representative document, and where the second redirect target document is referenced by the second representative document;
   determining that the first redirect target document and the second redirect target document are duplicative;
   re-clustering the documents in response to determining that the first redirect target and the second redirect target are duplicative, where re-clustering the documents include combining the first subset and the second subset; and
   indexing, based on a document included in the combined first and second subsets, the combined first and second subsets.

2. The method of claim 1, where selecting the first representative document and the second representative document comprises:
   determining respective quality values for the documents;
   selecting, as the first representative document, a document of the first subset, associated with a highest quality value among the quality values of the documents in the first subset; and
   selecting, as the second representative document, a document of the second subset associated with a highest quality value among quality values of the documents in the second subset.

3. The method of claim 2, where determining the quality value comprises:
   determining the quality value for a document based on at least one of:
      link information associated with the document,
      a date on which the document was created,
      a document rank associated with the document,
      anchor text information associated with the document,
      an aesthetic value of an address associated with the document,
      a measure of popularity of the document,
      a measure of quality of a web site associated with the document, or
      an age of the web site associated with the document.

4. The method of claim 1, where determining the first redirect target document and the second redirect target document comprises:
   determining redirect information associated, respectively, with the first representative document and the second representative document;
   determining the first redirect target document based on the redirect information associated with the first representative document; and
   determining the second redirect target document based on the redirect information associated with the second representative document.

5. The method of claim 1, where determining that the first redirect target document and the second redirect target document are duplicative comprises:
   determining, based on a predictive-based clustering technique, that each of the first redirect target document and the second redirect target document includes a same predictive identifier (ID).

6. The method of claim 1, where determining that the first redirect target document and the second redirect target document are duplicative is based on a comparison of network addresses, associated respectively with the first redirect target document and the second redirect target document.

7. The method of claim 6, where the network addresses, respectively associated with the duplicative first redirect target document and the second redirect target document, are different.

8. The method of claim 1, where the first redirect target document and the second redirect target document are determined to be duplicative when the first redirect target document and the second redirect target document share a particular common content.

9. The method of claim 1, where the documents in the first subset share a first characteristic, and where the documents in the second subset share a second characteristic that differs from the first characteristic.

10. A system, comprising:
    a memory; and
    a processor, connected to the memory, to:
       group documents into a plurality of clusters, where subsets of the documents grouped, respectively, into the plurality of clusters, are duplicative and differ from documents grouped into other ones the plurality of clusters;
       determine a measure of quality for each of the documents;
       select a representative document, respectively, for two of the plurality of clusters, based on the measure of quality;
       determine a target document associated with each of the representative documents;
       determine addresses associated with the target documents;
       determine that the target documents are duplicative based on the addresses associated with the target documents; and
       combine the target documents and the two of the plurality of clusters into a combined single cluster, in response to determining that the target documents are duplicative.

11. The system of claim 10, where, when determining the target document, the processor is further to:
    determine that one of the representative documents includes redirect information; and identify the target document, associated with the one of the representative documents, based on the redirect information included in the one of the representative documents.

12. The system of claim 10, where, when grouping the documents into the plurality of clusters, the processor is further to:
    form the plurality of clusters based on at least one of a content-based clustering technique or a predictive-based clustering technique.

13. The system of claim 10, where, when determining the target document, the processor further to:
    determine that one of the representative documents does not include redirect information; and
    identify the one of the representative documents as the target document.

14. The system of claim 10, where, when determining whether the target documents are duplicative based on the addresses, the processor is further to:
    determine the target documents are duplicative using a predictive-based clustering technique.

15. The system of claim 10, where the processor is to:
    select a representative document from the combined single cluster; and
    form a cluster based on the representative document of the combined single cluster.

16. The system of claim 10, where the processor is further to:
    select at least one canonical document from the combined single cluster; and
    index the at least one canonical document and not other documents in the combined single cluster.

17. The system of claim 10, where documents in the each of the plurality of clusters share a respective different characteristic.

18. A non-transient computer-readable medium containing instructions executable by at least one processor of a device, the instructions comprising:
    one or more instructions for collecting documents;
    one or more instructions for clustering the documents into a plurality of clusters, where each of plurality of clusters includes duplicative documents;
    one or more instructions for selecting a representative document, respectively, for two of the plurality of clusters;
    one or more instructions for determining a target document associated with each of the representative documents;
    one or more instructions for determining that the target documents are duplicative based on a predictive-based clustering technique; and
    one or more instructions for re-clustering the two of the plurality of clusters with the target documents into a single cluster, in response to determining that the target documents are duplicative.

19. The non-transient computer-readable medium of claim 18, where the one or more instructions for clustering further comprises:
    one or more instructions for clustering the documents based on a first clustering technique, and
    where the one or more instructions for re-clustering the documents further comprises:
    one or more instructions for re-clustering based on a second clustering technique that is different than the first clustering technique.

20. The non-transient computer-readable medium of claim 18, where the instructions further comprise:
    one or more instructions for selecting a representative document for the single cluster;
    one or more instructions for determining a checksum of the representative document associated with the single cluster; and
    one or more instructions for re-clustering the documents based on the checksum of the representative document.

21. The non-transient computer-readable medium of claim 18, where documents in the each of the plurality of clusters share a respective different characteristic.

22. A system comprising:
    means for forming documents into clusters, where each of plurality of clusters includes duplicative documents;
    means for selecting a representative document, respectively, from two of the clusters;
    means for identifying redirect information associated with the representative documents;
    means for determining a final target document for each of the representative documents;
    means for determining whether the final target documents are duplicate documents; and
    means for forming the identified two clusters and the final target documents into a unified cluster if it is determined that the final target documents are duplicate documents.

23. The system of claim 22, further comprising:
    means for selecting a canonical document from the unified cluster; and
    means for indexing the canonical document and not other documents in the unified cluster.

24. The system of claim 23, further comprising:
    means for calculating quality information associated with the unified cluster; and
    means for associating the quality information with the canonical document.

25. The system of claim 22, where documents in the each of the plurality of clusters share a respective different characteristic.

* * * * *